United States Patent [19]
Blanshine et al.

[11] 3,915,084
[45] Oct. 28, 1975

[54] UPPER APRON ASSEMBLY FOR USE WITH A ROLL BALE FORMING MACHINE

[75] Inventors: Allison W. Blanshine, Lititz; Edward T. Eggers; John K. Hale, both of New Holland, all of Pa.

[73] Assignee: Sperry Rand Corporation, New Holland, Pa.

[22] Filed: Jan. 7, 1974

[21] Appl. No.: 431,278

[52] U.S. Cl. ................................. 100/88; 56/341
[51] Int. Cl.² ..................... B30B 5/06; A01D 39/00
[58] Field of Search .......................... 100/118–120, 100/151–154, 76, 88, 5, 35; 56/341, 342, 343

[56] References Cited
UNITED STATES PATENTS

| | | | |
|---|---|---|---|
| 2,613,591 | 10/1952 | Bruns et al. | 100/152 X |
| 3,110,145 | 11/1963 | Avery | 56/341 |
| 3,473,613 | 10/1969 | Boyce | 171/18 X |
| 3,680,296 | 8/1972 | Beebout | 56/1 |
| 3,815,345 | 6/1974 | Mast et al. | 56/341 |
| 3,837,159 | 9/1974 | Vermeer | 100/88 |

*Primary Examiner*—Peter Feldman
*Attorney, Agent, or Firm*—John R. Flanagan; Frank A. Seemar; Joseph A. Brown

[57] ABSTRACT

An upper apron assembly used with a roll bale forming machine consisting of endless flexible members movably mounted to the upper frame of the roll bale forming machine and having transition members mounted at evenly spaced positions along the flexible members. These transition members are adapted to receive the ends of elongated members of the upper apron assembly which contact and compress the upper surface of the rolled material as it is being formed.

3 Claims, 3 Drawing Figures

UPPER APRON ASSEMBLY FOR USE WITH A ROLL BALE FORMING MACHINE

BACKGROUND OF THE INVENTION

This invention is directed to crop material roll forming machines and more particularly to the upper apron of the crop material roll forming machine.

For many years, it has been customary to harvest forage crops by mowing the crops, letting them dry in the fields, forming the dried crop into windrows, gathering the crops in windrowed form and forming the gathered crop material into rectangular bales.

Recently, it has been found that by forming the crop material into large compact rolls of material rather than rectangular bales, as previously done, the material in roll form could be deposited and left in the field because the rolled material tends to provide a self-shedding protective covering from inclement weather. Since the rolled bale can be left in the field the additional steps of gathering the rectangular bales and transporting the gathered bales to a storage area away from the elements can be eliminated.

Several methods for the forming of compact rolls of crop material have been devised throughout the years. In one of these methods the machine rolls a swath or windrow of material along the ground until a roll of desired size is obtained. Another, and more successful, method comprises a machine in which a swath or windrow of material is picked up from the field and directed onto a lower conveyor, this conveyor transports the material in one direction while an upper apron, usually positioned above and adjacent the conveyor moves in a opposite direction thereby rotating the crop material it contacts, in a circular motion. The crop material, during the hay rolling operation, exerts a variety of forces upon the upper apron assembly and in many situations have caused fractures of various components of the upper apron. Since it is the upper apron which essentially creates the roll of material it is essential that it be maintained in its proper form to optimize the roll forming operation.

OBJECTS AND SUMMARY OF THE INVENTION

The principle object of the present invention is to provide an improved roll bale forming machine having an improved construction for the upper apron assembly.

Another object of the present invention is to provide an improved roll bale forming machine having an upper apron which will not fracture, or fail during the roll forming operation.

The present invention contemplates an improved upper apron assembly for a crop material roll forming machine having a frame adapted to travel across the field and a floor mounted to the frame for receiving a swath of crop material. Conveying means are associated with the floor and cooperate with an upper apron, mounted for movement above the conveyor in an opposite direction thereto, for effectively rotating the crop material to form a roll. More specifically, the upper apron assembly of the present invention comprises transition members mounted at evenly spaced positions along endless flexible members rotatably mounted to the frame so that elongated members can be positioned between said transition members to give added strength to the elongated members thereby preventing structural failure of the elongated members during the roll forming operation.

Other objects and advantages of the present invention will become apparent and obvious from a study of the following description and the accompanying drawings which are merely illustrative of the present invention.

DETAILED DESCRIPTION OF THE PREFERRED EMBODIMENT

Figure 1:
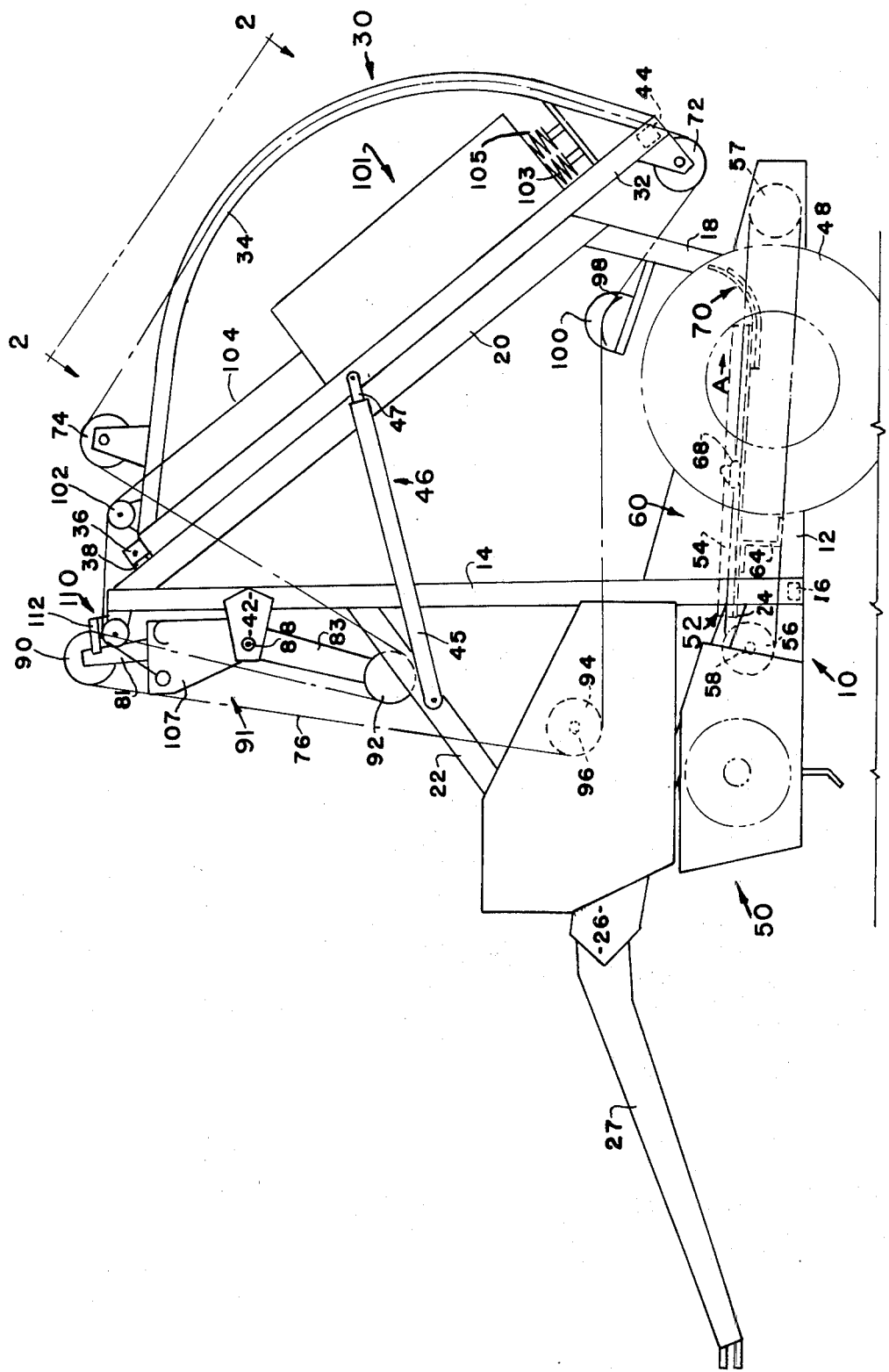
FIG. 1 is a side elevation of the hay roll forming machine.

Referring specifically to FIG. 1, the machine illustrated therein comprises a base frame 10 having sides fixedly connected together, such as by welding or the like. Each side of said frame comprises a bottom horizontal member 12. The forward end thereof is connected to a vertical member 14. Extending perpendicularly to the junction of members 12 and 14 is cross member 16, an end of which is fixedly connected to the junction of members 12 and 14. A short frame member 18 extends upwardly from the rearward portion of bottom member 12 and the upper end thereof is connected to one end of an upwardly and forwardly extending angular brace member 20, which is connected at its upper end to the upper end of vertical member 14. Extending forwardly from member 14 at each side of the machine is an A-frame consisting of angularly related members 22 and 24, the rearward ends of which are fixed to the front face of vertical member 14 and the forward ends being connected together at plate 26. Tractor hitch 27 is mounted to plate 26 and extends forwardly therefrom.

An upper frame 30 is provided with side frames composed of straight frame members 32, the ends of which are connected to the opposite ends of an arcuate frame member 34. The uppermost portion of each side frame member is pivotally connected at 36 to a suitable bearing fixed to the upper end of brace 20. Frame member 38 extends from the upper end of angular brace member 20 to stabilize the connection of the upper frame 30 at pivotal connection 36. The upper end of base frame 10 is stabilized transversely by a bracing member (not shown) which extends between vertical members 14.

The lower rearward end of upper frame 30 also has a cross frame member 44 extending between the opposite sides of the frame composed of members 32 and 34.

Upper frame 30 is moved from its lower, bale forming position, FIG. 1, to an extended bale discharge position (not shown) by a pair of hydraulic cylinders 46 (one cylinder of each pair being shown). These hydraulic cylinders have their barrel ends 45 connected to member 22 and their rod end 47 connected to member 32 of upper frame 30. Suitable hydraulic lines (not shown) are connected to opposite ends of cylinder 46 to simultaneously activate and control the operation of the upper frame.

The base frame 10 has a pair of wheels 48 (one wheel of each pair being shown) connected thereto at opposite sides of the frame by an axle (not shown) in order that the hay rolling machine may be drawn by a tractor or other suitable implement over a field for purposes of forming a roll of hay or similar forage material.

Extending forwardly from the front end of base frame 10 is a pickup header 50. This header is adapted to engage, elevate and rearwardly feed a swath or windrow of forage material onto the crop material roll forming machine. The material engaged by the header is passed rearwardly from the entrance end of lower apron 52 towards the rear of the machine. The lower apron 52 comprises a conveying means having a series of endless, flexible chains 54 which are transversely spaced apart even distances and which extend around driven sprockets 56 rotatably mounted on shaft 58 at the forward end of the hay rolling machine. The chains 54 also pass around idler 57 rotatably mounted at the rear of the machine. Mounted above the horizontal member of frame 10 is floor 60. The floor is rigidly connected to frame 10 by a series of extending bars 64, the opposite ends of which are suitably connected to horizontal member 12 of base frame 10 to support the floor in a horizontal position. The upper course of chains 54 slide in channels (not shown) positioned on the top of floor 60. The channels are transversely spaced and suitably secured to the floor to support and guide the chains across the floor of the machine. The links of chains 54 have lugs 68 connected thereto. The upper courses of the chains 54 move in direction A shown in FIG. 1, so that the forward edges of the lugs engage and direct the material rearwardly across the floor of the machine.

The rearmost end of floor 60 contains a series of springs 70. These springs are mounted to the floor and extend up and away from the floor of the machine. These springs are mounted between the channels, described above, which contain chains 54 thereby acting as a continuation of the floor of the machine. It is this configuration of the floor of the hay rolling machine which directs the crop material, conveyed across the floor of the machine, into contact with the upper apron.

The upper frame 30 contains upper apron 76 which is mounted for rotative movement on various guide rollers and sprockets.

Figure 2:
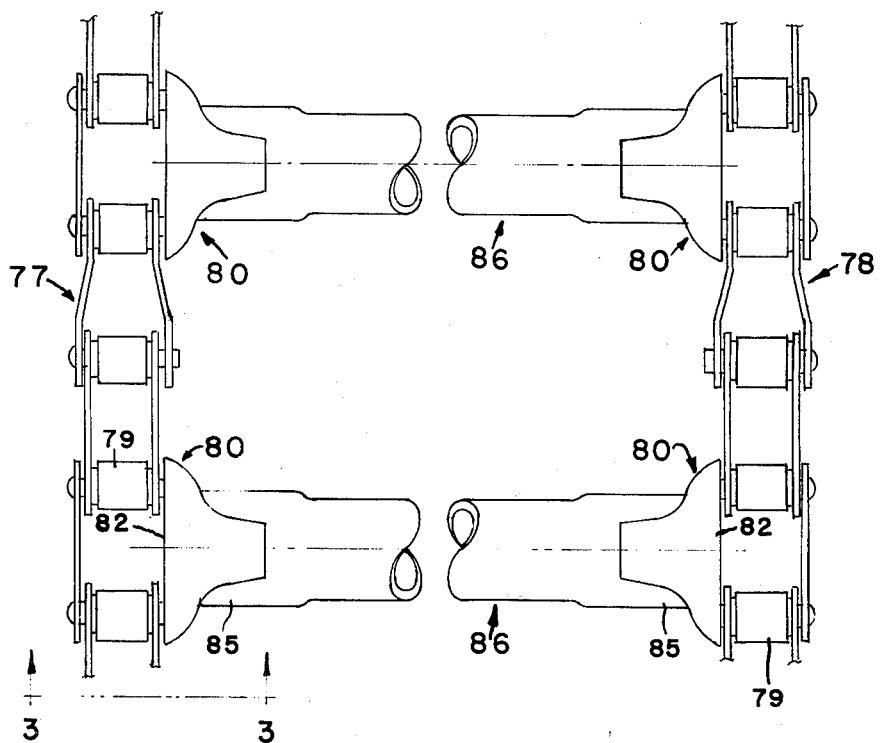
FIG. 2 is a view of the hay roll fomring machine taken along lines 2—2 of FIG. 1.
Figure 3:
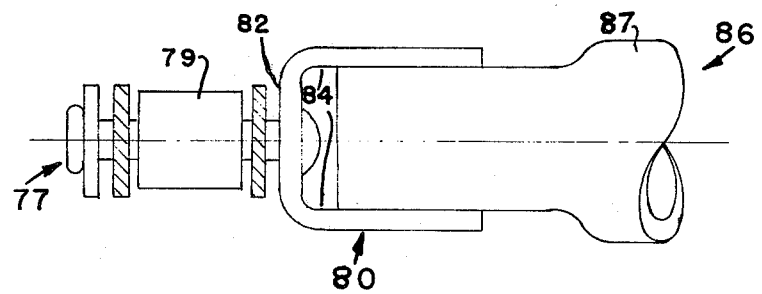
FIG. 3 is an enlarged view of the upper apron taken along lines 3—3 of FIG. 2.

As shown in FIGS. 2 and 3, the upper apron comprises a pair of endless flexible link type chains 77 and 78 positioned on either side of the upper frame. These chains contain rollers 79 which contact and are driven by the above mentioned rollers and sprockets. Mounted at evenly spaced distances along the endless flexible link type chains are transition members 80. These transition members have a mounting portion 82 which is rigidly secured to chains 77 and 78. These members also contain a U-shaped section 84 adapted to receive the ends 85 of elongated members 86. These elongated members have body sections 87 which can be of any shape (e.g., cylindrical, rectangular, etc.). The respective ends of these elongated members are formed so as to be easily inserted into transition members 80. Once the ends are so inserted they are welded into position thereby rigidly mounting the elongated members in proper relative position with respect to flexible chains 77 and 78. Further, these transition members provide a rigid mounting which will prevent failure of the elongated members where said elongated members are connected to chains 77 and 78.

As previously mentioned upper apron 76 is supported and driven by various rollers and sprockets. At each side of upper frame 30, guide sprockets 72 and 74, respectively, are supported by clevises which are connected to the opposite ends of the arcuate members 34. Affixed to the end of shaft 88 which is supported in a bearing bracket 42 adjacent the upper end of vertical frame member 14, are pairs of oppositely extending arms 81 and 83. These arms comprise the expansion means 91 for the upper apron. The ends of said upper arms support rotatable guide sprockets 90 and 92 upon which the endless chains of the upper apron 76 extends in the mannner shown in FIG. 1. Connected to the expansion means is a spring and cable assembly 101. This assembly contains a cable 104 which passes over pulleys 102. The cable has one end connected to the expansion means at cam 107 and another end connected to springs 103 and 105. Also mounted to vertical frame member 14 is a breakaway mechanism 110 which includes a spring loaded retaining arm 112 which initially prevents rotation of the expansion means until a suitable core (i.e. with proper density) of material is formed. When the core of material reaches a particular, fixed diameter, the breakaway mechanism releases the expansion means so as to place entire control of the expansion means on cable assembly 101. Driving sprockets 94 are provided on each side of the main frame and are connected to a driven shaft 96 that is supported in appropriate bearings fixed relative to the main frame 10. The lower course of upper apron 76 also slideably extends over the upper curved surface of movably mounted auxiliary guide members 98. These auxiliary guide members are spring loaded and are adapted to be retracted into accommodating spaces in the side plates of the machine so as not to interfere with the ends of the rolled material as it is being formed. Therefore, as the roll increases in diameter the auxiliary guide plates are pushed through openings 100 thereby preventing any interference with the ends of the roll of material as it increases in diameter.

While the preferred structure in which the principles of the present invention have been incorporated as shown and described above, it is to be understood that the invention is not to be limited to the particular details, shown and described above, but that, in fact, widely different means may be employed in the practice of the broader aspects of the invention.

Having thus described the invention, what is claimed is:

1. In a crop material roll forming machine of the type having a mobile frame adapted to travel across a field, material delivery means supported by said frame and an upper apron assembly supported by said frame and mounted above said delivery means, said upper apron assembly and said delivery means defining a roll forming region extending between opposite sides of said frame, at least a portion of said delivery means adapted to move in a predetermined direction to deliver crop material from the field to said roll forming region, said upper apron assembly comprising:

endless flexible members movably mounted to said opposite sides of said frame above said delivery means and adapted to move in a direction opposite to that of said delivery means;

a plurality of transition members mounted to said endless members at corresponding spaced locations therealong; and a plurality of elongated members for engaging crop material when delivered to said region and in cooperation with said delivery means for applying pressure to said crop material to effect rolling of said material into a roll, each of said elongated members extending between, and being rigidly interfitted at its opposite end portions with, corresponding ones of said transition members in generally transverse alignment with said flexible members so as to provide structural integrity of said elongated members of said upper apron assembly during the rolling of crop material at said roll forming region;

each of said transition members being comprised by a mounting portion mounted to an inner side of a respective one of said endless flexible members and spaced projecting portions rigidly extending inwardly from, and transversely to, said mounting portion and being adapted to interfit with a respective one of said opposite end portions of said elongated members.

2. The machine as set forth in claim 1, wherein:

said endless flexible members comprise a pair of endless link-type chains; and said transition members are mounted at said corresponding spaced locations to oppositely facing sides of said chains so as to position said elongated members in generally transverse alignment with said chains.

3. The machine as set forth in claim 1, wherein each of said end portions of said elongated members is adapted to be inserted into and fixedly mounted to said spaced projecting portions of one of said transition members.

* * * * *